United States Patent [19]

Mottier et al.

[11] Patent Number: 4,606,639

[45] Date of Patent: Aug. 19, 1986

[54] BROAD BANDWIDTH INTERFEROMETRIC GAUGING SYSTEM

[75] Inventors: Francois M. Mottier, West Hartford; Martin C. Foster, Plantsville, both of Conn.

[73] Assignee: United Technologies Corporation, Hartford, Conn.

[21] Appl. No.: 682,721

[22] Filed: Dec. 17, 1984

[51] Int. Cl.[4] .............................................. G01B 9/02
[52] U.S. Cl. .................................... 356/358; 356/363
[58] Field of Search ........................ 356/357, 358, 363

[56] References Cited

U.S. PATENT DOCUMENTS 908,725  1/1909  Ashley .
1,901,632  3/1933  Chamberlain .
2,604,004  7/1952  Root .
2,666,267  1/1954  Root .
3,741,659  6/1973  Jones, Jr. ............................. 356/357

Primary Examiner—Davis L. Willis
Assistant Examiner—Matthew W. Koren
Attorney, Agent, or Firm—J. Kevin Grogan

[57] ABSTRACT

An optical gauging system comprises a fixture for rotating a workpiece to provide registration of the workpiece surfaces with a measurement optical path and optical interference apparatus for reflecting a measurement optical beam off said surfaces to provide an optical interference signal indicative of the distance between successive surfaces.

2 Claims, 5 Drawing Figures

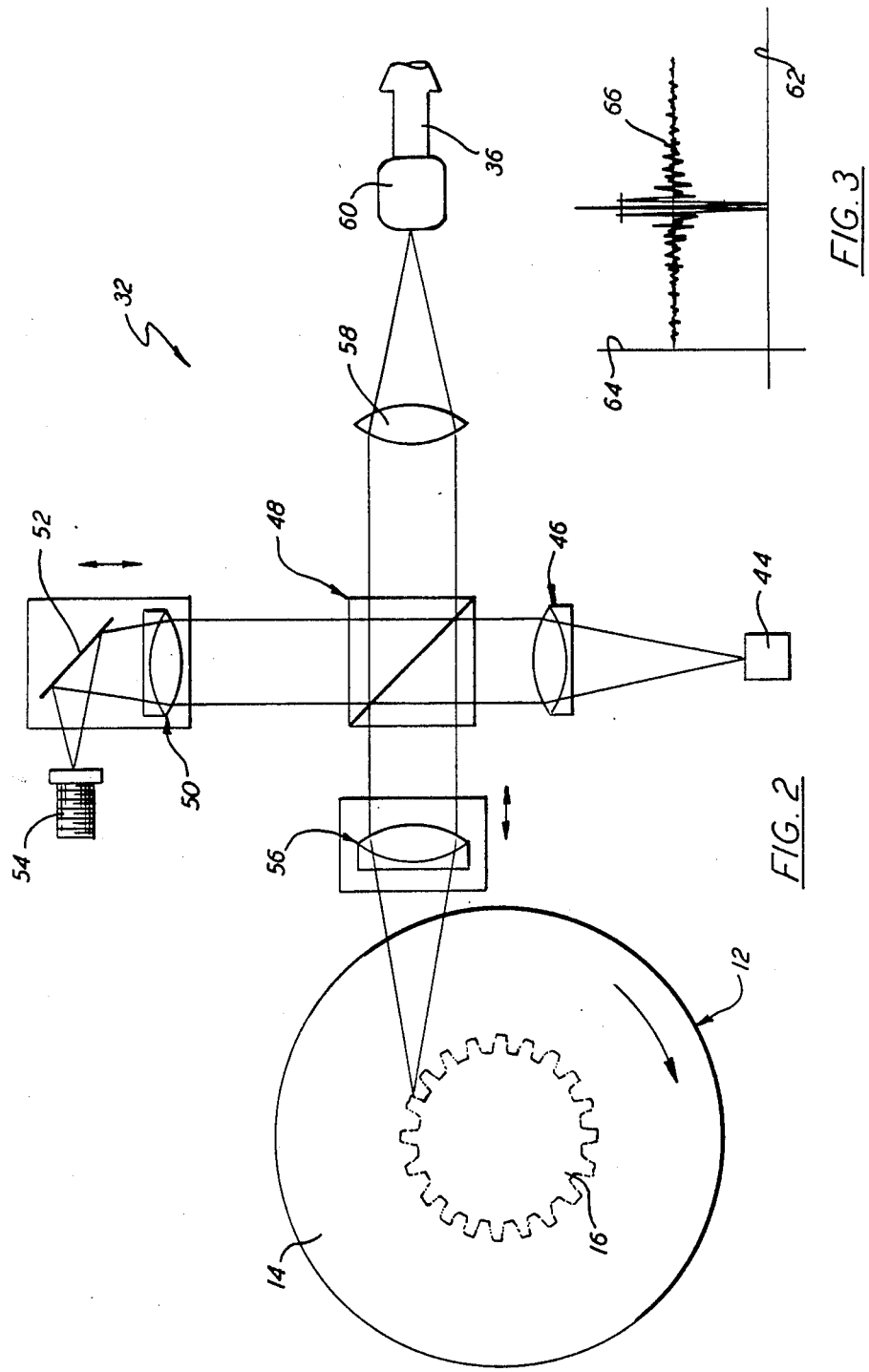

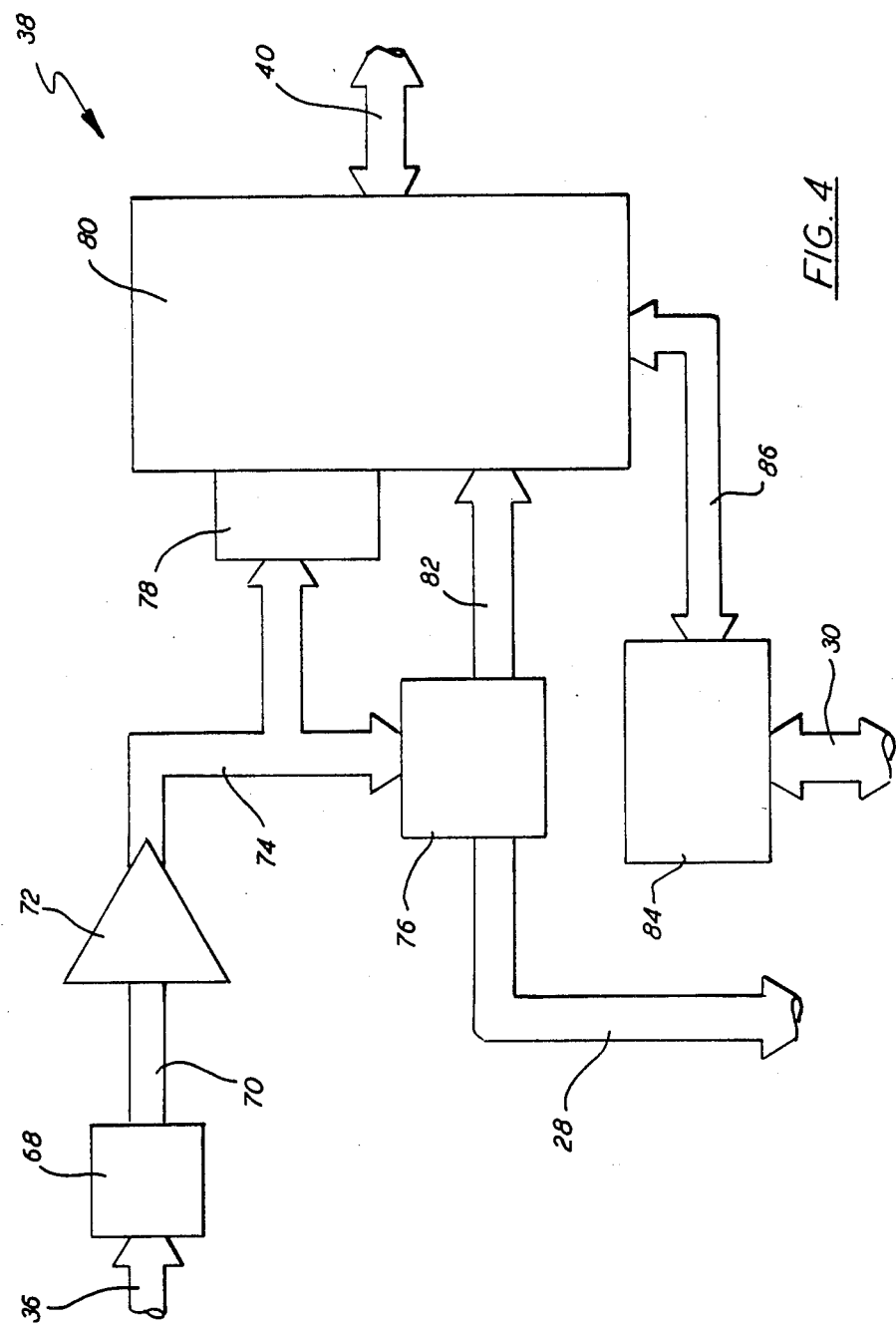

BROAD BANDWIDTH INTERFEROMETRIC GAUGING SYSTEM

DESCRIPTION

1. Technical Field

This invention relates to optical gauging systems and more particularly to optical gauging systems employing broad bandwidth interferometers.

2. Background of the Invention

Metrology is an art whose technology is quite mature. To measure distances and surface variations in the micrometer range metrologists have used a variety of mechanical and optical devices, especially instruments employing optical interferometers since at least the turn of the century. Several generations of interferometers have been developed, each with a specific application in mind.

Perhaps the most fundamental interferometer that has been adapted for use in metrologic applications is the Michelson interferometer, which relies on light intensity or amplitude division of a single beam with subsequent beam recombination to produce interference. In its original configuration, the Michelson interferometer used white light. Unfortunately, the dynamic range of this configuration is quite limited. White light is characterized by a broad range of wavelengths, and interference occurs at different optical path lengths for different wavelengths. As a result, fringes occur only very near exactly equal path lengths, and the instruments have very poor range.

A variation of the Michelson interferomter is the Twyman-Green interferometer. This device also relies on light amplitude division, but employs monochromatic light, such as that produced by a laser. This alternative light source substantially enhances the dynamic range of the instrument, and allows for observation of multiple wavelength variations in linear or surface dimensions. In conventional metrologic applications both the Michelson and Twyman-Green interferometers require highly polished, well oriented surfaces for operation.

One application for interferometric measurement techniques has been as sensors for mechanical set point detection systems. These systems have potential utilization in a variety of mechanical applications where a precise, non-contacting sensor is desirable; such as in precision measurement of inter-tooth spacing of involute gears. The function of these devices is to detect singular positions on sequential gear teeth in a null gauging fashion, and indicate the distance between meausurements.

Instruments that utilize Michelson or Twyman-Green interferometers have several drawbacks in this application. Generations of these interferometric devices have endeavored to maximize dynamic range and signal to noise ratio. The applicable interferometric prior art, including U.S. Pat. Nos. 2,666,267, 2,604,004, 1,901,632 and 908,725 seek to overcome the disadvantages of multichromatic light by limiting the spectral content of the light used in the instrument with a prism or by substituting a monochromatic light source such as a sodium vapor lamp.

Since a null gauge detection sensor system seeks only unitary point determination, the periodic nature of the signal that is produced by the interferometers hereinabove described is not desirable. Each half wavelength interval fringe is indistinguishable from the next, so additional signal processing must be performed to determine the null point. The highly polished surfaces that are required for operation also burden these techniques. The surfaces of individual gear teeth are not specular enough to enable the hereinabove described devices to be employed. Interferometers utilizing a monochromatic source of light, such as a laser, are additionally burdened by the costs found in the coherent light source and the requisite alignment optics.

Other known gauging techniques are available to measure inter-tooth spacing of involute gears. These devices employ a variety of mechanical sensors which contact the tooth surface being measured. The disadvantages of contacting techniques include physical deterioration of the sensor, alignment of the sensor system, and calibration of the components used in the system, as well as the inherently slow speed of mechanically contacting gauges.

DISCLOSURE OF INVENTION

The object of the present invention is to provide an optical gauging system indicating the distance between teeth of a gear as measured from the surfaces of adjacent teeth.

According to the present invention, an optical gauging system comprises light source means which generates an optical signal, fixture means that rotates the workpiece to provide selectable registration of each of the workpiece surfaces with a measurement optical path, and which provides an encoder signal which indicates the incremental amount of rotation. The system further comprises an optical interference means which divides the optical signal into two beams, the first is reflected along the measurement optical path and the second is reflected along a reference optical path. The measurement optical beam is reflected off of each workpiece surface that registers with the measurement optical path. The interference means recombines both beams at the output of each optical path and produces optical interference in the recombined beam when the registration of each surface corresponds to a selected spatial position in the measurement path. Also included are means for providing an electrical signal equivalent of the optical interference signal and a signal processing means, responsive to the encoder signal and to the electrical interference signal, which has a memory means for storing signals that periodically samples and stores the electrical interference signal and the encoder signals associated therewith, calculates a maximum amplitude value from among the plurality of sampled values stored in the memory and identifies the stored encoder signal associated therewith and compares the encoder value associated with the present maximum amplitude with the encoder value associated with the preceding maximum amplitude. The processing means provides a signal indicative of the distance between successive workpiece surfaces.

According to another aspect of the invention, the light source means comprises an optical source having a coherence of less than one hundred center wavelengths.

These and other objects, features and advantages of the present invention will become more apparent in the light of the following detailed description of a best mode embodiment thereof, as illustrated in the accompanying Drawing.

BRIEF DESCRIPTION OF DRAWINGS

FIG. 2 is an illustration of one element of the system diagram of FIG. 1 for use with the present invention;

FIG. 3 is an illustration of a signal provided by the element of FIG. 2;

FIG. 4 is a simplified block diagram of another element of the system block diagram of FIG. 1 for use with the broad bandwidth interferometric gauging system of the present invention.

BEST MODE FOR CARRYING OUT THE INVENTION

Figure 1:
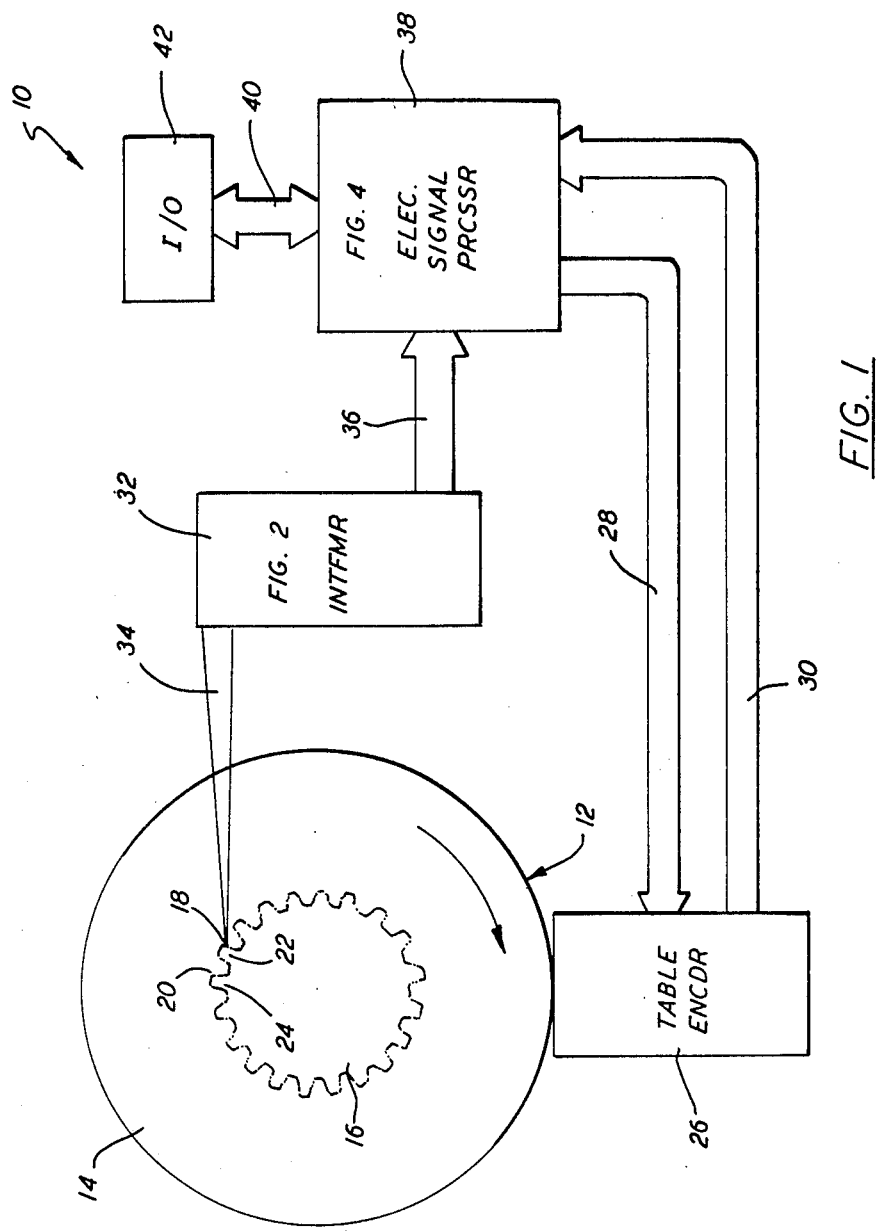
FIG. 1 is a simplified block diagram of the broad bandwidth interferometric gauging system of the present invention.

Referring to FIG. 1, in a simplified block diagram of the broad bandwidth interferometric gauging system 10 of the present invention, the interferometric gauging system includes fixture 12 that has a reference platform (not shown), and a work platform 14 on which is disposed gear 16 having surfaces 18 and 20 of individual gear teeth 22 and 24, respectively. The fixture provides for rotation of the work platform relative to the reference platform about a rotation axis perpendicular to the planes containing the surfaces.

Table encoder 26 is responsive to the fixture rotation. In response to a trigger signal on lines 28, the encoder provides signals on lines 30 that indicate the total rotation of the work platform relative to a fixture reference position. In addition, the encoder provides incremental rotation signals on lines 30. In the best mode embodiment, the fixture comprises a rotary table and encoder capable of a resolution of 720,000 parts per revolution.

As hereinafter detailed in FIG. 2, interferometer 32 provides for amplitude division interferometry. A measurement optical beam 34 from the interferometer illuminates gear surface 18. The beam is reflected back into the interferometer where it is recombined with a reference optical beam to provide an optical interference beam. The interferometer provides an equivalent electrical interference signal on lines 36.

As hereinafter detailed in FIG. 4, electronic signal processor 38, having a memory for storing signals, receives signals on lines 30 from the table encoder and signals on lines 36 from the interferometer. In response to the interference signal, the signal processor provides for sampling of the interference signal and the encoder signal. The correlated signal samples are stored in memory. The waveform distribution of the amplitude peaks of these sampled signals is calculated, and a signal indicative of the encoder signal that corresponds to the maximum of the calculated waveform is generated and stored within the processor.

Continued rotation of the fixture work platform results in adjacent work surface 20 reflecting the measurement optical beam back to the interferometer. The signal processor repeats the algorithm described hereinabove, differences the current value of the maximum encoder signal with maximum value last calculated, and provides a signal on lines 40 to input/output device 42 indicative of the rotational distance between gear teeth surfaces.

FIG. 2 is a simplified schematic drawing of the interferometer 32 of FIG. 1. Light source 44 generates an optical signal. In the best mode embodiment, the source is an incoherent one characterized by a broad spectral bandwidth, having a coherence length of less than 50 micrometers. However, those skilled in the art will recognize that the coherence length of the light emitted by the light source can be any that is deemed to provide sufficient resolution of intertooth spacing.

The optical signal is gathered by lens 46 which collimates the light signal and directs it towards beamsplitter 48. The optical signal is divided into a reference optical beam and a measurement optical beam as it passes through the beamsplitter. The reference optical beam proceeds to lens 50 and on to mirrors 52 and 54 upon which the reference optical beam is reflected back along the reference optical path to the beamsplitter. The positioning of the lens 50 and mirrors 52 and 54 are adjustable to vary the optical path length of the reference beam.

The second optical beam is guided from the beamsplitter to focusing lens 56 that adjusts the focus of the measurement optical beam on the surface of the gear tooth. The measurement optical beam is scattered off of the gear tooth surface back through the focusing lens into the beamsplitter, where it is recombined with the reference optical beam. The recombined beam passes through focusing lens 58 to detector 60 that provides an equivalent electrical interference signal on lines 36. In the best mode embodiment, the detector comprises a photodiode which provides a current proportional to the power of incident light. Although a photodiode is used in the best mode, those skilled in the art will note that equivalent means can also be employed.

Those skilled in the art will observe that because a broad bandwidth light source is employed, the lenses and other optical components described hereinabove must be free of chromaic aberation. The tolerance of the achromats used must be chosen to maintain the desired precision of the system. Additionally, it will be noted that movement of focusing lens 56 does not alter the optical path length of the measurement beam; it enhances the amount of scattered light from the surface that is returned along the measurement optical path.

The surface finish of the gear teeth need not be specular, but must only be sufficient to provide a reflected beam that allows the optical interference in the recombined beam to be detectable with techniques known to those skilled in the art. In the best mode embodiment, the surface roughness of the gear teeth may be approximately 80 to 100 micro-inches RMS.

In operation, the interferometer of FIG. 2 provides for amplitude division of the optical signal into two beams which suffer a relative phase change traversing optical paths of different lengths. The magnitude of the phase change is related to the path length difference. With the light source providing an optical signal, the optical path length of the reference beam is adjusted to be approximately equal to that of the measurement beam. The measurement beam is directed on to the surface of the gear such that rotation of the fixture (12, FIG. 1) moves the surface relative to the measurement beam and alters the optical path length of the measurement beam. Interference occurs in the recombined beam between the measurement optical beam and the reference optical beam, and is observable when the rotation of the fixture adjusts the measurement optical path length to equal that of the reference beam.

FIG. 3 illustrates the electrical interference signal provided by detector 60 on lines 36. Axes 62 and 64 are time and intensity, respectively. Waveform 66 corresponds to the electrical interference signal. As the gear is rotated through the equal optical path position, the period of the signal (one fringe) corresponds to a linear motion of approximately one-half the center wavelength of the light source. The fringe visibility or contrast varies as a function of the spectral bandwidth. As indicated hereinabove, the maximum signal occurs at the point where the optical path length of the two beams are perfectly matched (for all wavelengths). A light source having a wide spectral bandwidth produces an interference signal that is localized in the immediate vicinity of equal optical path lengths. As the bandwidth of the source narrows, the signal persists over a greater range than the equal optical path length. Theoretically, the signal becomes a pure cosine function for all values of optical path length when the light source is monochromatic FIG. 4 is a detailed block diagram of the electronic signal processor 38 of FIG. 1. The interference signal from interferometer (32, FIG. 1) is presented on lines 36 to electronic filter 68 that performs any required signal filtering. The filtered signal is provided on lines 70 to amplifier 72 for amplification or line buffering as needed. The amplified signal is presented on lines 74 simultaneously to both trigger source 76 and analog-to-digital converter 78. In response to an increase in the amplitude of the interference signal above a preselected level, trigger 76 provides a trigger signal on lines 28 to the table encoder (26, FIG. 1) and provides a signal to computer 80 on lines 82.

Interface 84 buffers the incremental rotation signal provided by the encoder on lines 30, and converts these encoder signals to a square wave format as required by the computer and provides the converted signal on lines 86. In addition, the interface reads the current value of the total rotation of the work platform from lines 30 as provided by the table encoder.

In the best mode embodiment, computer 80 comprises a PDP 11/34 having a memory for storing signals along with the appropriate support hardware and software. Those skilled in the art will recognize that equivalent computer means may be substituted. In addition to receiving encoder signals on lines 86 from the interface, the computer also receives digitized interference signals from the analog-to-digital converter. The computer receives control signals and provides output signals on lines 40 to the input/output device (42, FIG. 1).

In operation, the trigger generates a signal when the amplitude of the amplified interference signal exceeds a preselected level. The trigger signals are provided on lines 28 to the encoder (26, FIG. 1) and on lines 82 to the computer. In response to the trigger signal, the encoder samples and holds the current value of the total rotation of the fixture. In addition, it provides incremental rotation signals on lines 30 to the interface. For a preselected time, the computer samples the digitized interference signal provided by the analog-to-digital converter and the buffered incremental rotation signals provided by the interface on lines 86. Additionally, the computer instructs the interface to read the current value of the total fixture rotation in the encoder and present that value on lines 86.

The interference signal samples and their corresponding encoder samples are stored in memory along with the current value of the total fixture rotation. Once these signals are stored, the computer selects the amplitude maxima of the sampled signals and fits that distribution to Gaussian curve, approximated by a parabolic curve using the method of least squares, although equivalent curve fitting techniques can be used. The fit is accomplished by finding the constants A, B and C of the equation $$Y = A + Bt + Ct^2$$

where Y is the estimated signal amplitude envelope, and t corresponds to the time. The peak is found by setting the derivative equal to zero, yielding $$DY/DT = B + 2Ct_0 = 0$$

Thus the waveform peak corresponds to $$t_0 = -B/2C$$

Once the position of the peak of the interference signal is found, the corresponding encoder signal sample is identified. The computer calculates the number of encoder signals from the receipt of the trigger signal to the interference signal peak encoder signal and adds that value to the current value of the total fixture rotation to obtain the rotational position of the table at the interference signal peak.

Continued rotation of the table causes an adjacent tooth surface to intersect the measurement optical path and the hereinabove described algorithm will be repeated. The encoder signal corresponding to the new peak is differenced with the position corresponding to the old peak, yielding the rotational distance between gear teeth surfaces. Those skilled in the art will note that any misalignment between the work platform's axis of rotation and the gear's central axis is compensated by incorporating a sine wave correction algorithm or equivalent means into the algorithm described hereinabove.

Figure 5:
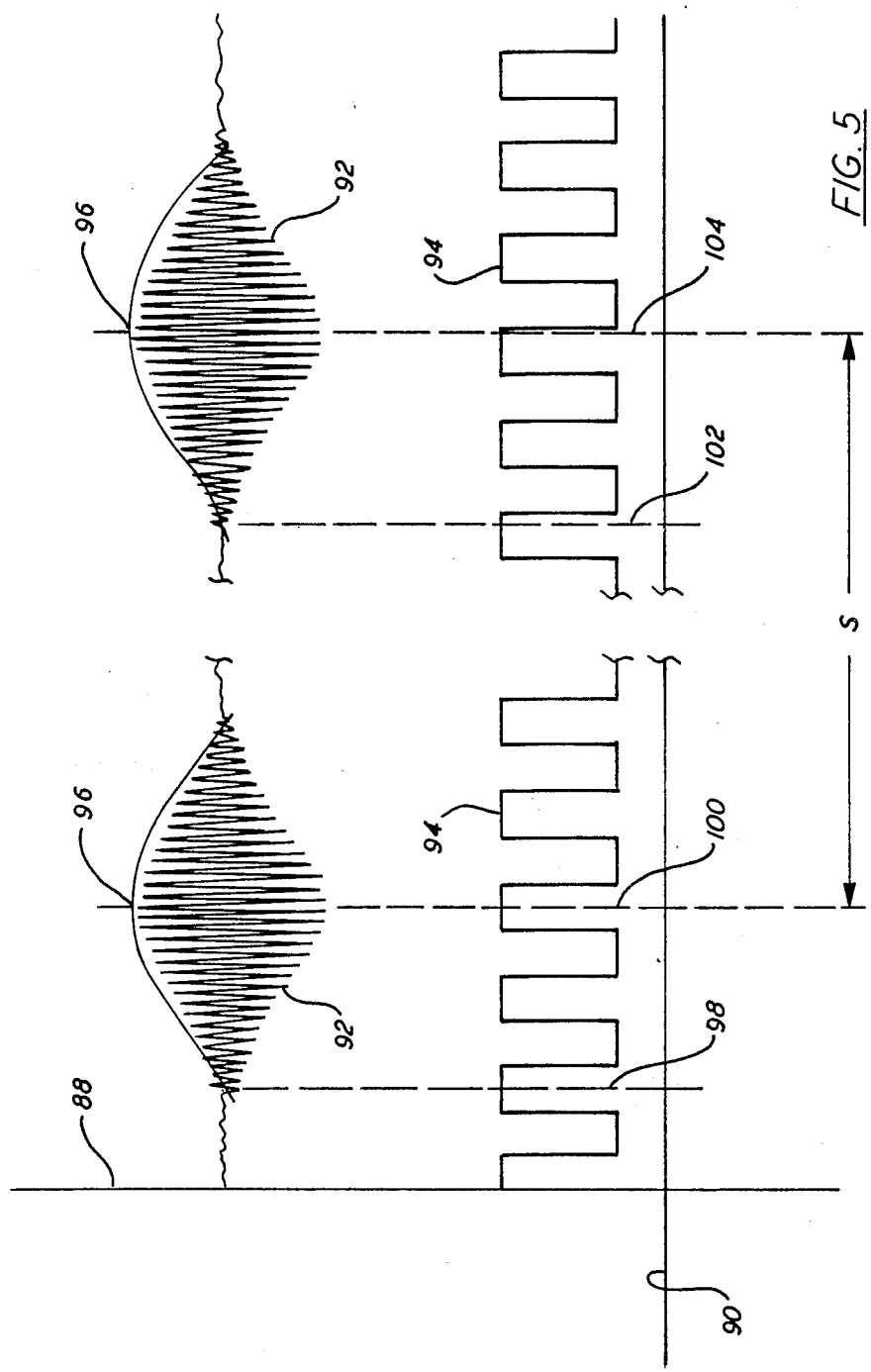
FIG. 5 is an illustration of two signals found in the element of FIG. 3.

FIG. 5 is an illustration containing the interference signal of two adjacent gear teeth surfaces and their corresponding encoder pulses. Axes 88 and 90 correspond to amplitude and time, respectively. Waveform 92 is the electrical interference signal as presented to the analog-to-digital converter. Waveform 94 is a square wave which corresponds to the buffered incremental rotation signal presented on lines 86 to the computer. Curve 96 corresponds to the waveform generated by the computer using the hereinabove described algorithm.

Encoder pulse 98 is indicative of the rotational position of the gear when a trigger signal is received by the computer and signal sampling begins. As hereinabove described, encoder signal 100 is identified with the calculated maximum of the interference signal, allowing for the rotational position of the maximum to be found.

Encoder signal 102 corresponds to the rotational position of the gear for the adjacent tooth, and signal 104 is identified by the computer with the interference signal maximum. The intertooth spacing (S) is found by calculating the number of pulses between signal maximum and multiplying that number by the amount of rotation per pulse.

Similarly, although the invention has been shown and described with respect to a best mode embodiment thereof, it should be understood by those skilled in the art that various other changes, omissions and additions thereto may be made therein without departing from the spirit and scope of the invention.

We claim:

1. An optical gauge for measuring the distance between surfaces of a workpiece, comprising:
light source means, for providing an optical signal;
fixture means, for positioning the workpiece to provide transient registration of each workpiece surface with a measurement optical path, and for providing an encoder signal having incremental values indicative of incremental distances between moving surfaces;
optical interference means, for dividing said optical signal into first and second optical beams reflected along first and second optical paths, respectively, said first optical path being coincident with said measurement path for reflecting said first beam off each workpiece surface registered therewith, said interference means recombining said beams at the output of said optical paths producing optical interference in said recombined beam in the presence of registration of each workpiece surface at a selected spatial position in said measurement path;
means for providing an electrical signal equivalent of said optical interference; and
signal processing means, responsive to said encoder signal and to said electrical interference signal, and including memory means for storing signals, for
periodically sampling and storing in said memory means, samples of said electrical interference signal amplitude and said encoder signal incremental value associated therewith,
calculating a maximum amplitude value from among said plurality of sampled values stored in said memory means and identifying said stored encoder signal value associated therewith, and
comparing a encoder value associated with a present maximum amplitude with the preceding encoder value associated with a preceding maximum amplitude to provide the signal difference value therebetween as indicative of the distance between successive workpiece surfaces.

2. The optical gauge of claim 1, wherein said light source means comprises a light source whose optical signal has a coherence of less than one hundred center wavelengths.

* * * * *